United States Patent
Mohan Kalyanasundaram et al.

(10) Patent No.: US 9,659,234 B1
(45) Date of Patent: May 23, 2017

(54) ADAPTIVE SELECTION OF SCALE INVARIANT IMAGE FEATURE KEYPOINTS

(71) Applicant: INTEL CORPORATION, Santa Clara, CA (US)

(72) Inventors: Talat Anand Mohan Kalyanasundaram, Berlin (DE); Koba Natroshvili, Waldbronn (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/955,476

(22) Filed: Dec. 1, 2015

(51) Int. Cl.
| | |
|---|---|
| *G06K 9/46* | (2006.01) |
| *G06K 9/62* | (2006.01) |
| *G06T 7/00* | (2017.01) |
| *G06T 5/20* | (2006.01) |
| *G06T 5/50* | (2006.01) |

(52) U.S. Cl.
CPC ............. *G06K 9/623* (2013.01); *G06T 5/20* (2013.01); *G06T 5/50* (2013.01); *G06T 7/0085* (2013.01); *G06T 2207/20024* (2013.01); *G06T 2207/20076* (2013.01)

(58) Field of Classification Search
CPC ............. G06K 9/00711; G06K 9/209; G06T 2207/10024; G06T 2207/20036; G06T 2207/30232; G06T 2207/30236; G06T 7/0042; G06T 7/2033; G06T 7/204; G06T 7/2053; G06T 7/2066
USPC ....................................................... 382/190
See application file for complete search history.

(56) References Cited

U.S. PATENT DOCUMENTS

2015/0131851 A1* 5/2015 Bernal ............... G06K 9/00711
382/103

OTHER PUBLICATIONS

Lowe, David G., "Object Recognition from Local Scale-Invariant Features", The Proceedings of the International Conference on Computer Vision, Sep. 1999, vol. 2, pp. 1150-1157.
Puig, Luis et al., "Scale Space for Camera Invariant Features", IEEE Transactions on Pattern Analysis and Machine Intelligence, Sep. 2014, vol. 36, pp. 1832-1846.
Mohan Kalyanasundaram, Talat Anand, Scaling and Rotational Invariant Feature Selection for General Camera Types, 2015, Master Thesis.

* cited by examiner

*Primary Examiner* — Manuchehr Rahmjoo
(74) *Attorney, Agent, or Firm* — Finch & Maloney PLLC

(57) ABSTRACT

Techniques are provided for adaptive selection of feature keypoints of an image. An example system may include a contrast statistics calculation circuit configured to generate contrast measurements of regions of the image associated with each of the feature keypoints, and to calculate a mean and variance of the contrast measurements. The system may also include an edge statistics calculation circuit configured to generate ratios of principal curvatures of regions of the image associated with each of the feature keypoints, and to calculate a mean and variance of the ratios of principal curvatures. The system may further include a threshold calculation circuit configured to calculate thresholds based on the mean and variance of the contrast measurements and on the mean and variance of the ratios of principal curvatures; and a keypoint filter circuit configured to filter the set of feature keypoints based on the those thresholds.

21 Claims, 8 Drawing Sheets
(4 of 8 Drawing Sheet(s) Filed in Color)

ADAPTIVE SELECTION OF SCALE INVARIANT IMAGE FEATURE KEYPOINTS

BACKGROUND

Many image processing techniques rely on the detection of features in an image as a preliminary operation. For example, it may be desired to recognize an object in an image and the recognition is typically based on the detected features. As another example, it may be desired to stitch together two images taken by different cameras offering different perspectives of a scene. In this case, features common to both images may be identified and matched to each other to enable the images to be correctly registered relative to one another based on the common feature points. This typically involves some form of scaling, rotation, and alignment of one or both images based on the matched features prior to forming the stitched composition.

Existing techniques for detection (and matching) of image features typically produce acceptable results for conventional undistorted images. In some applications, however, it is useful to work with images provided by omnidirectional cameras or cameras with ultra-wide (e.g., fisheye) lenses. These images are generally subject to relatively high levels of visual distortion in order to capture the wide viewing angles required. Unfortunately, existing feature detection techniques do not work well with such distorted images.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides techniques for adaptive selection of scale invariant feature keypoints from an image. Feature keypoints are locations in an image that are associated with identifiable aspects of elements of the image, such as, for example, corners, edges, or other points of interest. The techniques, which include processing input images to detect and identify the most useful feature keypoints in the image, enable subsequent image processing operations, including feature matching, image stitching, object recognition, etc., to generate improved results with greater efficiency. These techniques may be particularly useful when the images are provided by cameras that generate relatively high levels of image distortion, such as omnidirectional cameras or cameras with ultra-wide angle lenses such as fisheye lenses.

In some embodiments, the adaptive selection of scale invariant feature keypoints is based on the collection of statistics related to contrast and "edge strength" of regions of the image associated with each feature keypoint, as will be explained in greater detail below. Thresholds are calculated based on these statistics and may be used to filter the entire set of available feature keypoints down to a smaller and more useful set. The filtering operation may also be based on parameters that adjust the use of these statistics in the filtering process. These parameters may be selected based on the content and nature of the image and on the desired number of filtered keypoints. The techniques described herein provide for generally increased computational efficiency compared to existing methods and may therefore be suitable for use in real-time image processing implementations. The techniques can be implemented in hardware or software or a combination thereof.

Figure 1:
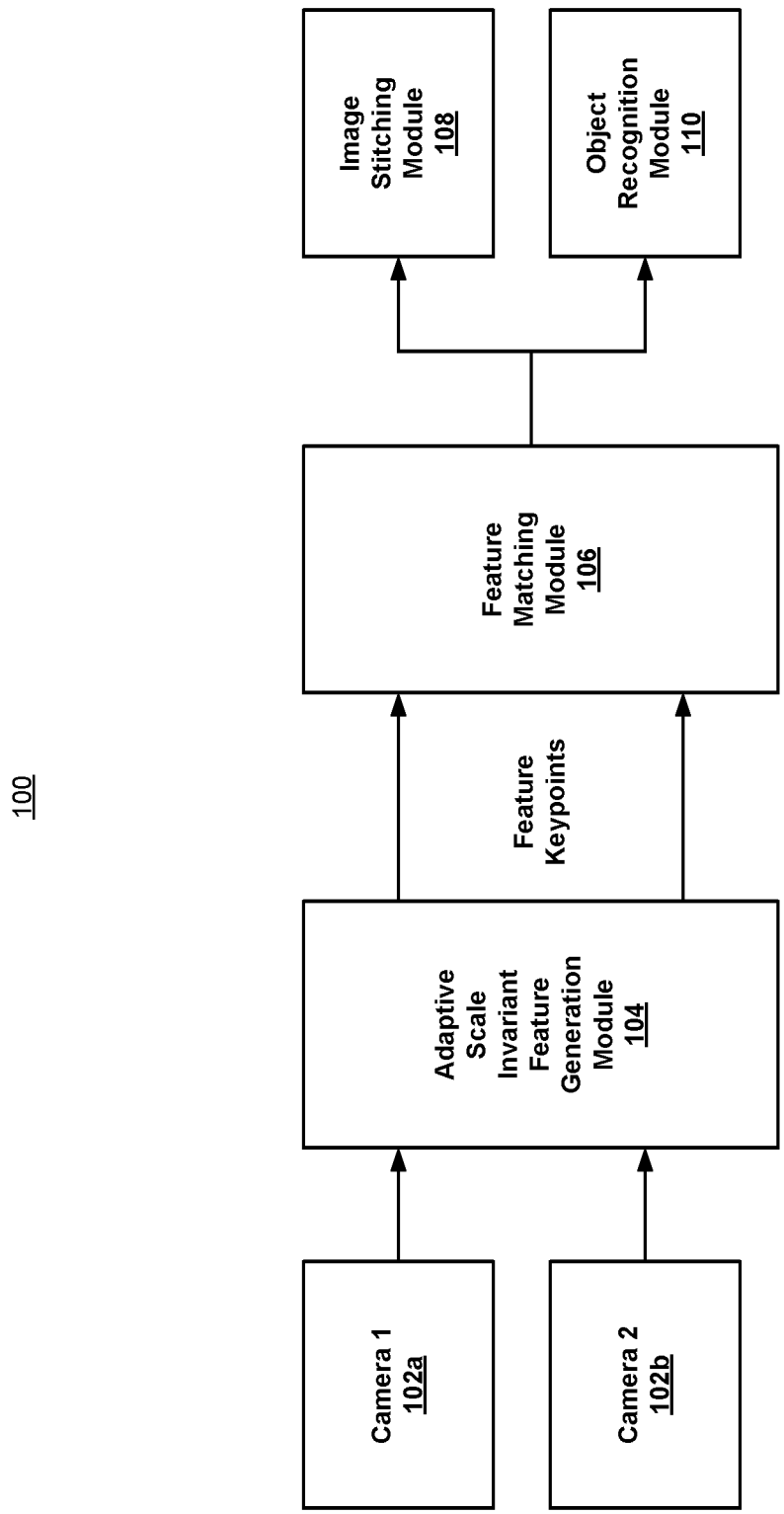
FIG. 1 is a top level system diagram of an image processing application based on adaptive selection of scale invariant image feature keypoints, in accordance with certain of the embodiments disclosed herein.

FIG. 1 is a top level system diagram 100 of an image processing application based on adaptive selection of scale invariant image feature keypoints, in accordance with certain of the embodiments disclosed herein. The system is shown to include one or more cameras 102a, 102b, an adaptive scale invariant feature generation module 104, a feature matching module 106 an image stitching module 108 and an object recognition module 110. The system may be configured to perform image processing tasks on a combination of images provided from the cameras 102. To illustrate just one possible example, cameras 102 may be positioned at the four corners of an automobile and configured to provide fisheye views from each corner to provide combined visual coverage encompassing a full 360 degrees around the vehicle. Such visual information may be useful, after suitable image processing as described below, in a self-driving car application, for example, or simply to provide a panoramic view to the driver.

The adaptive scale invariant feature generation module 104 may be configured to detect and identify feature keypoints (which may be scale invariant and/or rotation invariant) in each of the images for further processing by downstream modules 106, 108, 110. Feature keypoints are locations in an image that are associated with identifiable aspects of elements of the image, such as, for example, corners, edges, or other points of interest. Scale and rotation invariant features remain potentially identifiable despite changes in viewpoint, as would be the case for images from different cameras that provide overlapping coverage of regions of a scene. The adaptive scale invariant feature generation module 104 may be configured to select a reduced set of feature keypoints based on adaptive statistical calculations of the image. In particular, the selection or filtering may reject keypoints that have lower contrast relative to surrounding pixels in the neighborhood of the feature and may further reject keypoints that lie near an edge of any object or area in the image, as will be explained in greater detail below. Keypoints in lower contrast regions might not be visible if the illumination is reduced in a different image of the scene. Keypoints that are located near an edge can potentially be indistinguishable. For example, in a picture of an ocean horizon, a star in the sky is typically easier to recognize than two points on the horizon.

In some image processing application embodiments, the feature matching module 106 may be configured to match up these feature keypoints between the different camera images and the image stitching module 108 may be configured to integrate or stitch together the images by registering them relative to each other based on the matched feature keypoints. In some image processing application embodiments, the object recognition module 110 may be configured to detect or recognize objects within the images based on the feature keypoints. Of course other image processing applications are possible and additional downstream image processing modules may be employed to perform tasks such as, for example, structure and motion estimation, camera calibration and/or optical flow estimation.

Figure 2:
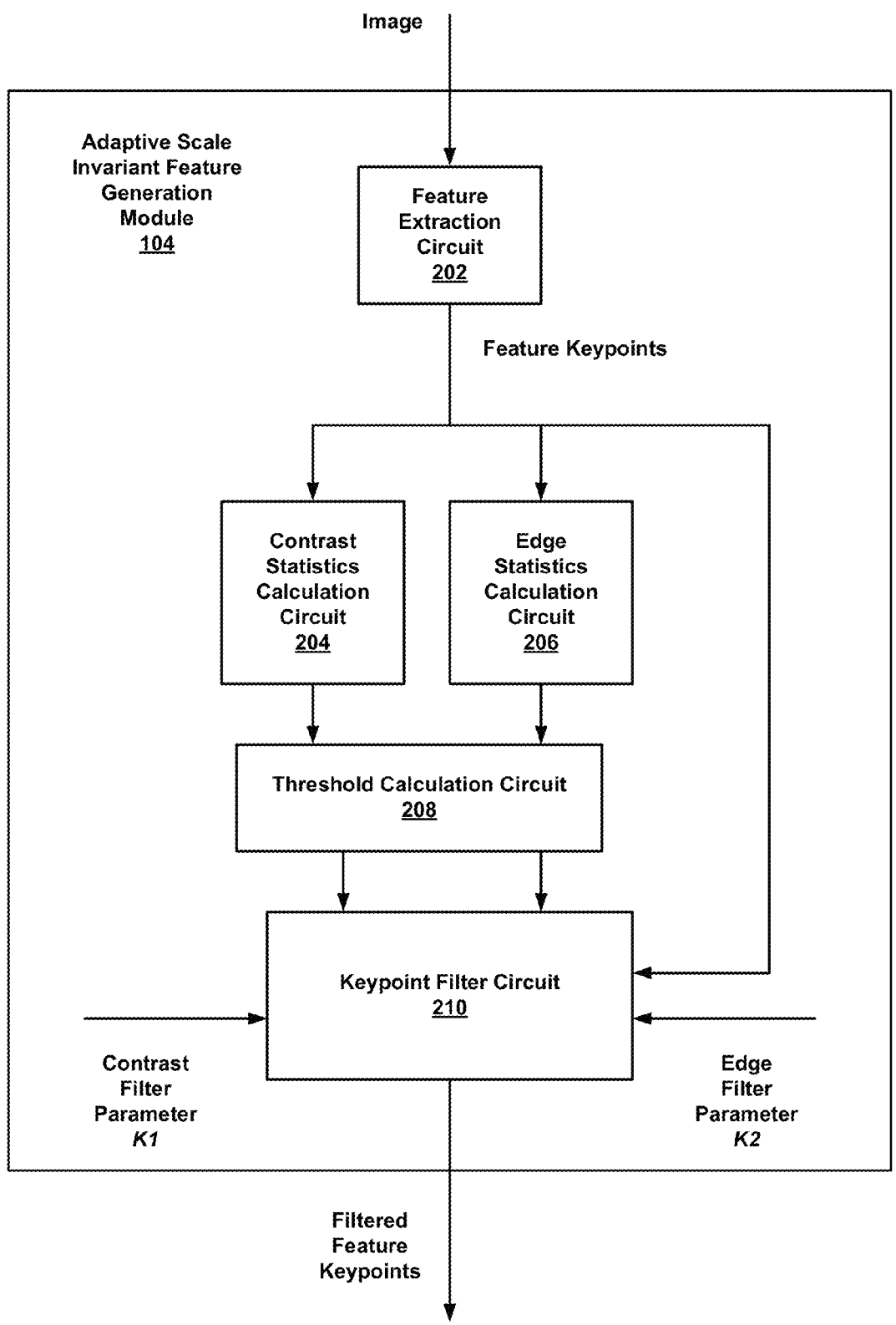
FIG. 2 is a more detailed block diagram of an adaptive scale invariant feature generation module, configured in accordance with certain of the embodiments disclosed herein.

FIG. 2 is a more detailed block diagram 200 of the adaptive scale invariant feature generation module 104, configured in accordance with certain of the embodiments disclosed herein. The adaptive scale invariant feature generation module 104 is shown to include a feature extraction circuit 202, a contrast statistics calculation circuit 204, an edge statistics calculation circuit 206, a threshold calculation circuit 208, and a keypoint filtering circuit 210.

The feature extraction circuit 202 may be configured to generate feature keypoints from an image. In some embodiments, the feature extraction circuit 202 is implemented using known techniques in light of the present disclosure, such as a scale invariant feature transform (SIFT). Other techniques may also be used including, for example, a Laplace-Beltrami SIFT.

The contrast statistics calculation circuit 204 may be configured to generate contrast measurements of regions of the image associated with each of the feature keypoints, and to calculate a mean and a variance of these contrast measurements. Contrast is determined by the gradient of the image. For example, the gradient for a pixel P at location (x, y) in an image can essentially be described as the degree of change in the image going from (x−1, y) to P (in the x direction) and from (x, y−1) to P (in the y direction) and from (x−1, y−1) to P (in the x and y, or diagonal direction). A keypoint at which these changes are relatively small, (and therefore of low contrast) will generally be less useful for downstream processing (feature matching, image stitching, object recognition, etc.) than a keypoint at a high contrast region. As an example of a limiting case, if all eight neighboring pixels around a key point have the same value as the key point, then the contrast is zero.

The edge statistics calculation circuit 206 may be configured to estimate the "edge strength," or degree to which the region in the neighborhood of the keypoint can be considered to be an edge of an object or area in the image. This is accomplished by generating ratios of principal curvature of regions of the image associated with each of the feature keypoints. Principle curvatures, and how they relate to edge strength, are illustrated and described in greater detail in connection with FIG. 3 below, but in general a larger ratio (i.e., the ratio of highest to lowest principal curvature) is associated with higher edge strength. Edge statistics calculation circuit 206 is further configured to calculate a mean and a variance of these principal curvature ratios.

The threshold calculation circuit 208 may be configured to calculate a first threshold (r') based on the mean and variance of the ratios of principal curvature, and a second threshold (c') based on the mean and variance of the contrast measurements. The first threshold (ratio threshold) may be calculated as the sum of the mean of the ratios of principal curvature and a product of a first scale factor ($k_1$) and the square root of the variance of the ratios of principal curvature:

$$r' = \bar{r} + k_1 * \sqrt{\mathrm{var}(r)}$$

The second threshold (contrast threshold) may be calculated as the sum of the mean of the contrast measurements and a product of a second scale factor ($k_2$) and the square root of the variance of the contrast measurements:

$$c' = \bar{c} + k_2 * \sqrt{\mathrm{var}(c)}$$

The keypoint filtering circuit 210 may be configured to filter the set of feature keypoints based on the first and second thresholds (c', r'). The keypoint filter circuit 210 may remove keypoints associated with strong edge features and keypoints associated with lower contrast features in the image through a comparison of those characteristics to the threshold values (c', r'). The adaptive scale invariant feature generation module 104 thus dynamically adapts feature keypoint generation based on the contrast and edge properties of each image.

The scale factors ($k_1$, $k_2$) may also be selected to adjust (e.g., reduce) the number of filtered feature keypoints. This will reduce the computational costs of downstream image processing since there will be fewer keypoints to process, and those keypoints will be of higher value, thus providing improved results.

Figure 3:
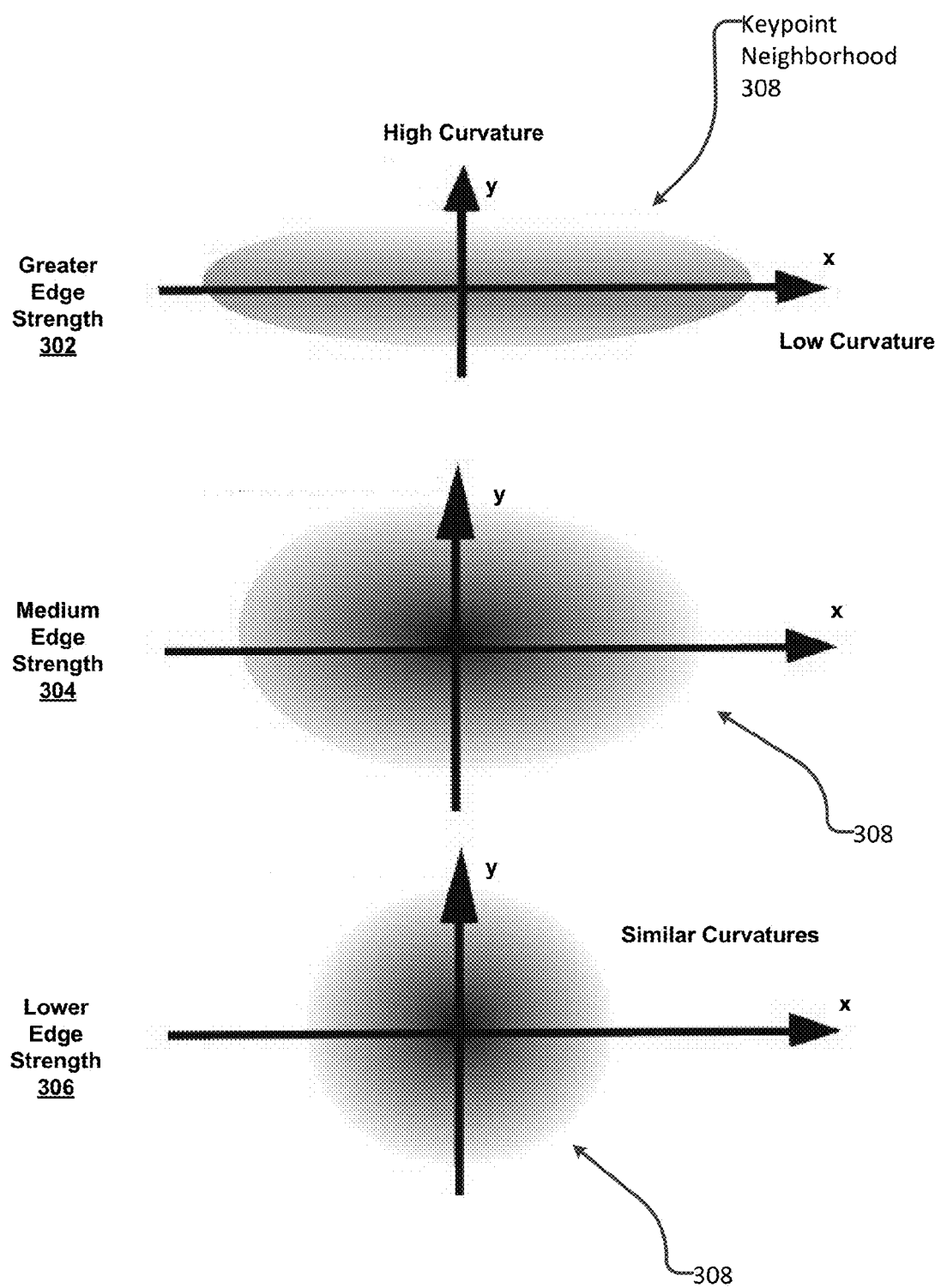
FIG. 3 illustrates an application of principal curvatures to edge detection, in accordance with certain of the embodiments disclosed herein.

FIG. 3 illustrates an application of principal curvatures to edge detection, in accordance with certain of the embodiments disclosed herein. Principal curvatures provide a description of how fast the image is changing along two perpendicular directions. The ratio of the higher to the lower value provides an indication of the edge strength or "edginess" characteristic of the region. Three examples of a simplified image element (in a keypoint neighborhood 308) are shown: one with relatively greater edge strength 302, one with medium edge strength 304 and one with relatively lower edge strength 306. In element 302 there is a high curvature or rate of change along the y axis and a low curvature (essentially zero curvature) along the x axis. The principle curvature ratio in this case is relatively high and indicates a stronger edge characteristic. In element 306, the curvatures along both the x axis and the y axis are nearly identical and thus the principal curvature ratio is low, approximately 1, indicating a weak edge characteristic. The adaptive scale invariant feature generation module 104 will tend to retain keypoint features in neighborhoods with lower edge strength like 306 and discard keypoint features in neighborhoods with higher edge strength like 302.

Figure 4:
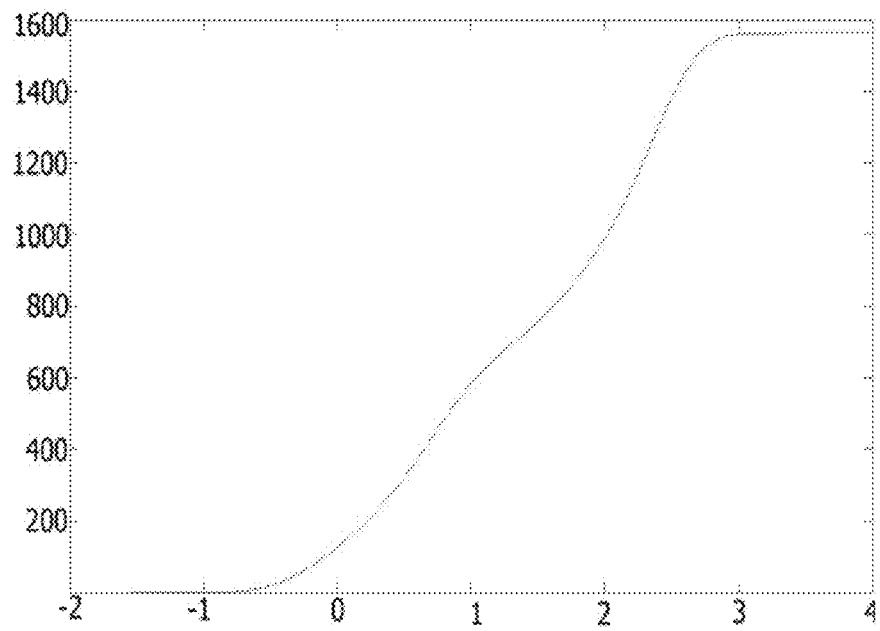
FIG. 4 illustrates a plot of the number of extracted image feature keypoints as a function of threshold selection, in accordance with certain of the embodiments disclosed herein.

FIG. 4 illustrates a plot 400 of the number of filtered image feature keypoints (generally designated as 404) as a function of threshold based on scale factor selection (in this example $k_1$, generally designated as 402), in accordance with certain of the embodiments disclosed herein. It can be seen that as the scale factor $k_1$ decreases (and thus the ratio threshold r' decreases), the filter, which retains feature keypoints below the threshold, passes a smaller number of feature keypoints.

Figure 5:
FIG. 5 illustrates image feature keypoints generated by an adaptive scale invariant feature generation system, configured in accordance with certain of the embodiments disclosed herein.

FIG. 5 illustrates image feature keypoints generated by an adaptive scale invariant feature generation system, configured in accordance with certain of the embodiments disclosed herein. In image 502, provided for comparison, a relatively large number (e.g., several hundred to a thousand) of feature keypoints (illustrated by red dots) are generated through conventional feature extraction without the benefit of the adaptive scale invariant feature generation system. Most of these will be of limited use by a feature matching system attempting to match up features from different viewpoints, as illustrated and described in connection with FIG. 6 below, or by an object recognition system. In fact, as will be seen, only 5 of the features, indicated by the larger yellow dots, were successfully matched. The remaining hundreds of features consumed processing resources and confused the matching algorithms resulting in poorer performance at increased computational cost. Many of the features, for example 510, were due to specular reflections from the road surface, which are not suitable for matching.

In image 504, by contrast, adaptive scale invariant feature generation greatly reduced the number of feature keypoints to a more useful set that resulted in 29 successful matches as indicated by the larger yellow dots 512.

Figure 6:
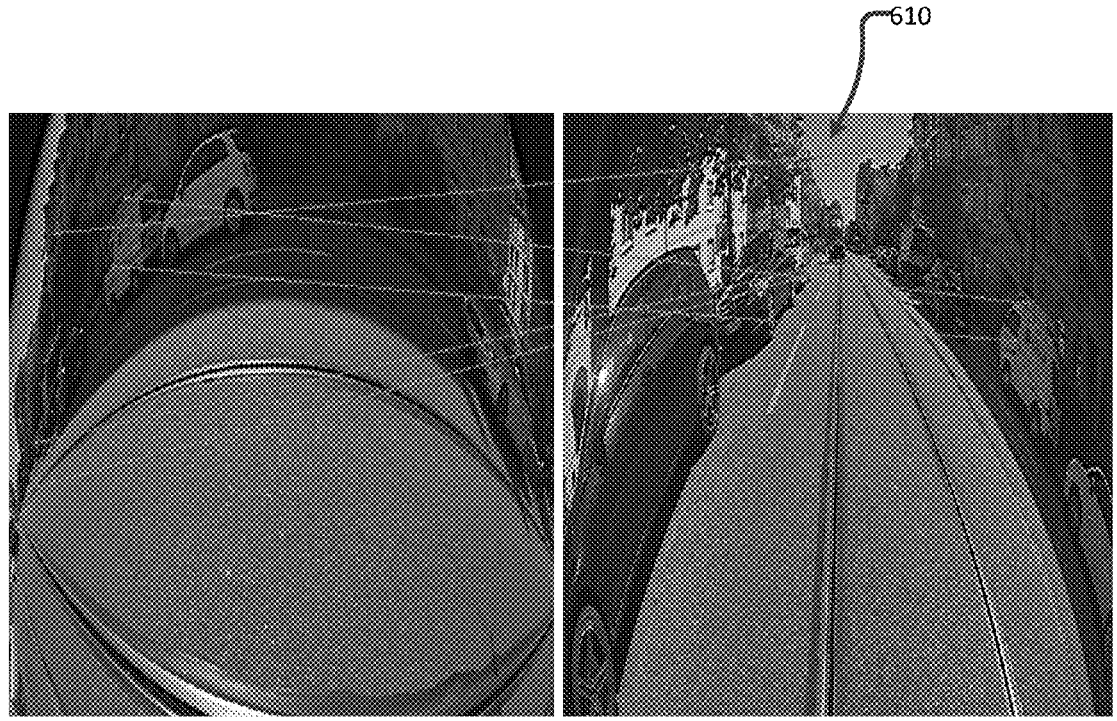
FIG. 6 illustrates mapping of feature keypoints between images by a system configured in accordance with certain of the embodiments disclosed herein.
Figure 6:
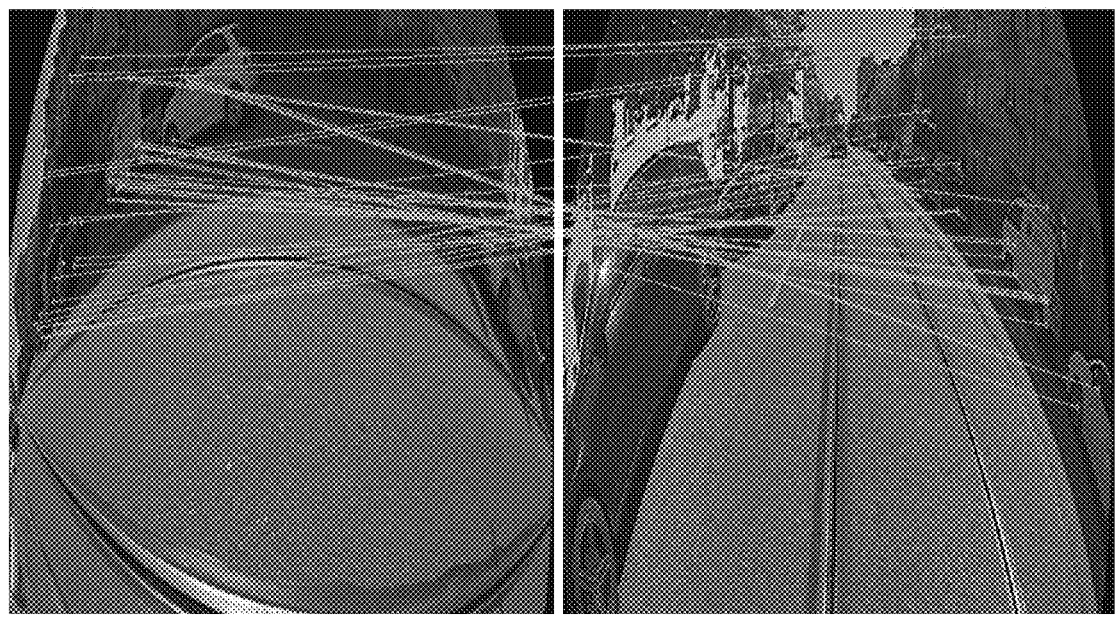

FIG. 6 illustrates mapping of feature keypoints between images by a system configured in accordance with certain of the embodiments disclosed herein. Images 602 and 606, on the left hand side, illustrate the view from a first fisheye lens camera looking across a street. Images 604 and 608, on the right hand side, illustrate the view from a second fisheye lens camera looking down the same street. Matches between feature keypoints from each view are illustrated by lines 610. The 5 successful matches between images 602 and 604 resulted from the large unfiltered feature set in image 502 of FIG. 5. By contrast, the 29 successful matches between images 606 and 608 resulted from the reduced feature set in image 504 that was produced by the adaptive scale invariant feature generation module 104.

Methodology

Figure 7:
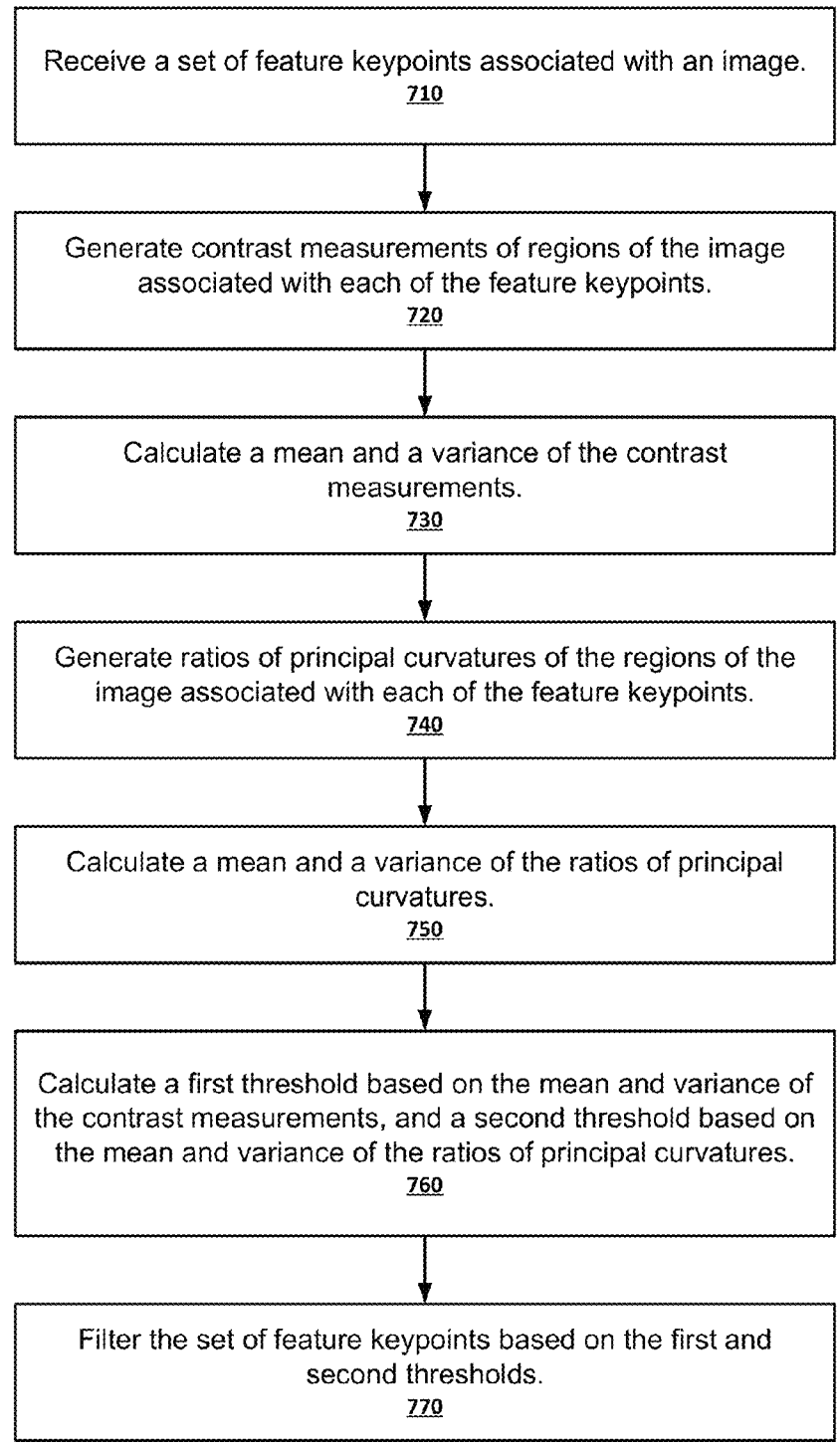
FIG. 7 is a flowchart illustrating a methodology for adaptive selection of image feature keypoints, in accordance with certain of the embodiments disclosed herein.

FIG. 7 is a flowchart illustrating an example method 700 for adaptive selection of image feature keypoints, in accordance with an embodiment of the present disclosure. As can be seen, example method 700 includes a number of phases and sub-processes, the sequence of which may vary from one embodiment to another. However, when considered in the aggregate, these phases and sub-processes form an adaptive image feature keypoint selection process in accordance with certain of the embodiments disclosed herein. These embodiments can be implemented, for example using the system architecture illustrated in FIG. 2, as described above. However other system architectures can be used in other embodiments, as will be apparent in light of this disclosure. To this end, the correlation of the various functions shown in FIG. 7 to the specific components illustrated in FIG. 2 is not intended to imply any structural and/or use limitations. Rather other embodiments may include, for example, varying degrees of integration wherein multiple functionalities are effectively performed by one system. For example, in an alternative embodiment a single module can be used to perform all of the functions of method 700. Thus other embodiments may have fewer or more modules and/or sub-modules depending on the granularity of implementation. Numerous variations and alternative configurations will be apparent in light of this disclosure.

As illustrated in FIG. 7, in one embodiment, method 700 for adaptive selection of image feature keypoints commences by receiving, at operation 710, a set of feature keypoints associated with an image. The feature keypoints may be generated by a Scale Invariant Feature Transform (SIFT) performed on the image, or by other suitable techniques. The image may be received from a camera or other device capable of generating images, and in particular, images with a relatively high degree of visual distortion to capture a wide angle field of view. Next, at operation 720, contrast measurements are generated for regions of the image associated with each of the feature keypoints. At operation 730, a mean and a variance are calculated for the contrast measurements.

At operation 740, ratios of principal curvatures are generated for regions of the image associated with each of the feature keypoints. At operation 750, a mean and a variance are calculated for the ratios of principal curvatures.

At operation 760, first and second thresholds are calculated. The first threshold is based on the mean and variance of the contrast measurements and the second threshold is based on the mean and variance of the ratios of principal curvatures. In some embodiments, the first threshold is calculated as the sum of the mean of the contrast measurements and a product of a first scale factor and the square root of the variance of the contrast measurements. Similarly, the second threshold is calculated as the sum of the mean of the ratios of principal curvatures and a product of a second scale factor and the square root of the variance of the ratios of principal curvatures. At operation 770, the set of feature keypoints is filtered based on the first and second thresholds.

Of course, in some embodiments, additional operations may be performed, as previously described in connection with the system. These additional operations may include, for example, selecting the first scale factor and the second scale factor to adjust the number of filtered feature keypoints. Additionally, in some embodiments, the selection of scale factors for filtering results in the removal of feature keypoints associated with edge features in the image.

Example System

Figure 8:
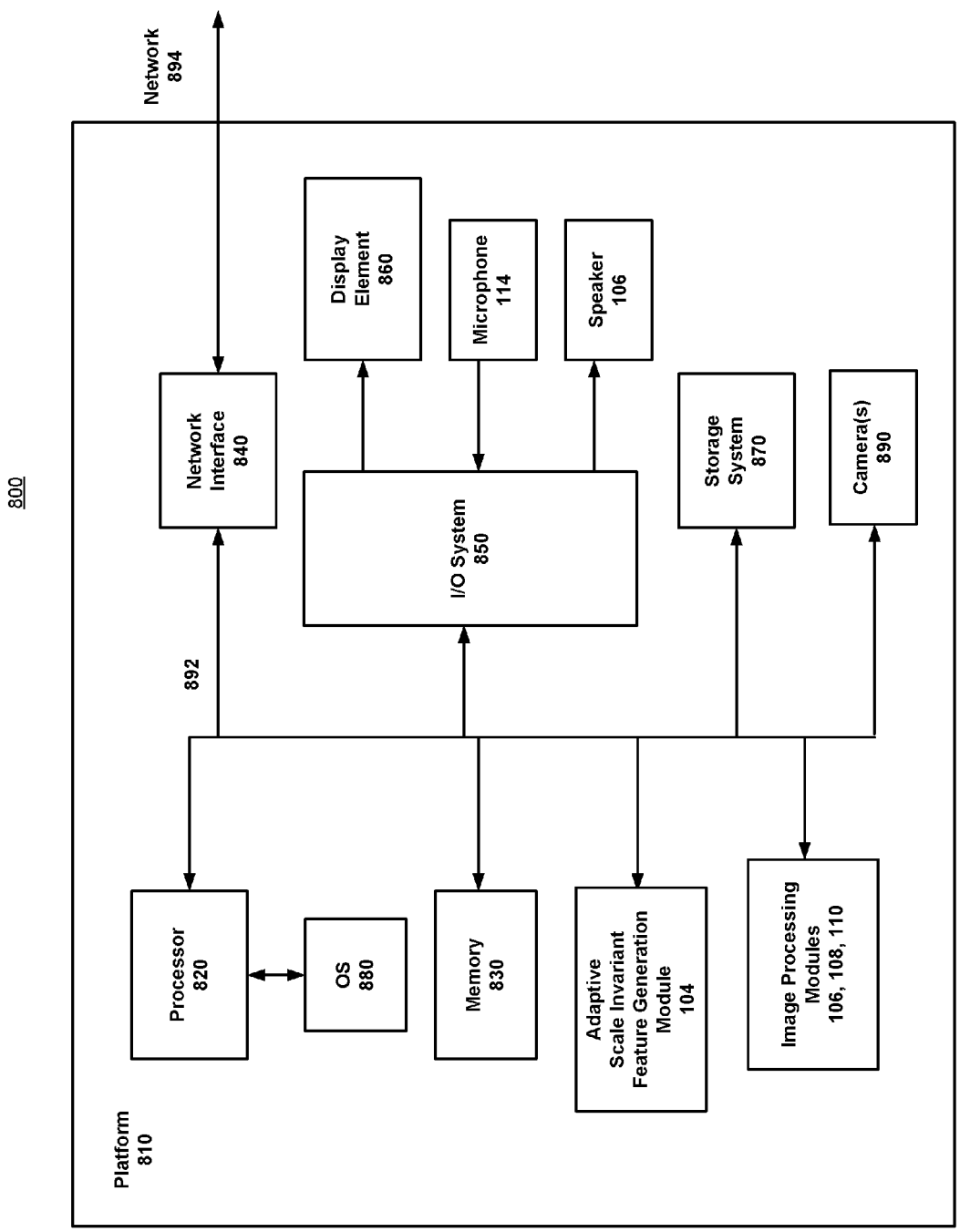
FIG. 8 is a block diagram schematically illustrating a system platform to carry out adaptive selection of image feature keypoints, configured in accordance with certain of the embodiments disclosed herein.

FIG. 8 illustrates an example system 800 that may carry out adaptive selection of image feature keypoints, to reduce the number and improve the quality of the generated keypoints, as described herein. In some embodiments, system 800 comprises a platform 810 which may host, or otherwise be incorporated into a vehicle computer system, personal computer, workstation, laptop computer, ultra-laptop computer, tablet, touchpad, portable computer, handheld computer, palmtop computer, personal digital assistant (PDA), cellular telephone, combination cellular telephone and PDA, television, smart device (for example, smartphone, smart tablet or smart television), mobile internet device (MID), messaging device, data communication device, and so forth. Any combination of different devices may be used in certain embodiments.

In some embodiments, platform 810 may comprise any combination of a processor 820, a memory 830, an adaptive scale invariant feature generation module 104, one or more cameras 890, other image processing modules (e.g., feature matching module 106, image stitching module 108, object recognition module 110) a network interface 840, an input/output (I/O) system 850, a display element 860, a microphone 114, a speaker 106 and a storage system 870. As can be further seen, a bus and/or interconnect 892 is also provided to allow for communication between the various components listed above and/or other components not shown. Platform 810 can be coupled to a network 894 through network interface 840 to allow for communications with other computing devices, platforms or resources. Other componentry and functionality not reflected in the block diagram of FIG. 8 will be apparent in light of this disclosure, and it will be appreciated that other embodiments are not limited to any particular hardware configuration.

Processor 820 can be any suitable processor, and may include one or more coprocessors or controllers, such as an audio processor or a graphics processing unit, to assist in control and processing operations associated with system 800. In some embodiments, the processor 820 may be implemented as any number of processor cores. The processor (or processor cores) may be any type of processor, such as, for example, a micro-processor, an embedded processor, a digital signal processor (DSP), a graphics processor (GPU), a network processor, a field programmable gate array or other device configured to execute code. The processors may be multithreaded cores in that they may include more than one hardware thread context (or "logical processor") per core. Processor 820 may be implemented as a complex instruction set computer (CISC) or a reduced instruction set computer (RISC) processor. In some embodiments, processor 820 may be configured as an x86 instruction set compatible processor.

Memory 830 can be implemented using any suitable type of digital storage including, for example, flash memory and/or random access memory (RAM). In some embodiments, the memory 830 may include various layers of memory hierarchy and/or memory caches as are known to those of skill in the art. Memory 830 may be implemented as a volatile memory device such as, but not limited to, a RAM, dynamic RAM (DRAM), or static RAM (SRAM) device. Storage system 870 may be implemented as a non-volatile storage device such as, but not limited to, one or more of a hard disk drive (HDD), a solid state drive (SSD), a universal serial bus (USB) drive, an optical disk drive, tape drive, an internal storage device, an attached storage device, flash memory, battery backed-up synchronous DRAM (SDRAM), and/or a network accessible storage device. In some embodiments, storage 870 may comprise technology to increase the storage performance enhanced protection for valuable digital media when multiple hard drives are included.

Processor 820 may be configured to execute an Operating System (OS) 880 which may comprise any suitable operating system, such as Google Android (Google Inc., Mountain View, Calif.), Microsoft Windows (Microsoft Corp., Redmond, Wash.), or Apple OS X (Apple Inc., Cupertino, Calif.) and/or various real-time operating systems. As will be appreciated in light of this disclosure, the techniques provided herein can be implemented without regard to the particular operating system provided in conjunction with system 800, and therefore may also be implemented using any suitable existing or subsequently-developed platform.

Network interface module 840 can be any appropriate network chip or chipset which allows for wired and/or wireless connection between other components of computer system 800 and/or network 894, thereby enabling system 800 to communicate with other local and/or remote computing systems, servers, and/or resources. Wired communication may conform to existing (or yet to developed) standards, such as, for example, Ethernet. Wireless communication may conform to existing (or yet to developed) standards, such as, for example, cellular communications including LTE (Long Term Evolution), Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 850 may be configured to interface between various I/O devices and other components of computer system 800. I/O devices may include, but not be limited to, a display element 860, microphone 114, speaker 106, and other devices not shown such as a keyboard, mouse, etc.

I/O system 850 may include a graphics subsystem configured to perform processing of images for display element 860. Graphics subsystem may be a graphics processing unit or a visual processing unit (VPU), for example. An analog or digital interface may be used to communicatively couple graphics subsystem and display element 860. For example, the interface may be any of a high definition multimedia interface (HDMI), DisplayPort, wireless HDMI, and/or any other suitable interface using wireless high definition compliant techniques. In some embodiment, the graphics subsystem could be integrated into processor 820 or any chipset of platform 810. In some embodiments, display element 860 may comprise any television type monitor or display, including liquid crystal displays (LCDs) and light emitting diode displays (LEDs). Display element 860 may comprise, for example, a computer display screen, touchscreen display, video monitor, television-like device, and/or a television. Display element 860 may be digital and/or analog. Under the control of the OS 880 (or one or more software applications), platform 810 may display processed images on display element 860. The images may be provided by camera(s) 890, or other sources, and processed by adaptive scale invariant feature generation module 104 and other image processing modules 106, 108, 110, etc, as described herein.

Camera(s) 890 may be configured to provide images ranging from conventional to ultra-wide angle, such as fisheye and omnidirectional type images. Embodiments of the systems described herein may be particularly suited for processing of ultra-wide angle images that are generally subject to a relatively high degree of visual distortion to capture the wide angle field of view.

It will be appreciated that in some embodiments, the various components of the system 100 may be combined or integrated in a system-on-a-chip (SoC) architecture. In some embodiments, the components may be hardware components, firmware components, software components or any suitable combination of hardware, firmware or software.

Adaptive scale invariant feature generation module 104 is configured to adaptively select or filter feature keypoints of an image based on calculated statistics related to contrast and edge strength associated with the region of the image surrounding those keypoints. Adaptive scale invariant feature generation module 104 may include any or all of the components illustrated in FIG. 2 and described above. Adaptive scale invariant feature generation module 104 can be implemented or otherwise used in conjunction with a variety of suitable software and/or hardware that is coupled to or that otherwise forms a part of system 800. Adaptive scale invariant feature generation module 104 can additionally or alternatively be implemented or otherwise used in conjunction with user I/O devices that are capable of providing information to, and receiving information and commands from, a user. These I/O devices may include display element 860, a textual input device such as a keyboard, and a pointer-based input device such as a mouse. Other input/output devices that may be used in other embodiments include a touchscreen, a touchpad, a speaker 106, and/or a microphone 114. Still other input/output devices can be used in other embodiments.

In some embodiments adaptive scale invariant feature generation module 104 may be installed local to system 800, as shown in the example embodiment of FIG. 8. Alternatively, system 800 can be implemented in a client-server arrangement wherein at least some functionality associated with adaptive scale invariant feature generation module 104 is provided to system 800 using an applet, such as a JavaScript applet, or other downloadable module. Such a remotely accessible module or sub-module can be provisioned in real-time in response to a request from a client computing system for access to a given server having resources that are of interest to the user of the client computing system. In such embodiments the server can be local to network 894 or remotely coupled to network 894 by one or more other networks and/or communication channels. In some cases access to resources on a given network or computing system may require credentials such as usernames, passwords, and/or compliance with any other suitable security mechanism.

In various embodiments, system 800 may be implemented as a wireless system, a wired system, or a combination of both. When implemented as a wireless system, system 800 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, system 800 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example in one embodiment at least one non-transitory computer readable storage medium has instructions encoded thereon that, when executed by one or more processors, cause one or more of the feature keypoint selection methodologies disclosed herein to be implemented. The instructions can be encoded using a suitable programming language, such as C, C++, object oriented C, JavaScript, Visual Basic .NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, adaptive scale invariant feature generation module 104 may filter the generated feature keypoints by leveraging processing resources provided by a remote computer system accessible via network 894. In other embodiments the functionalities disclosed herein can be incorporated into other software applications, such as image/video editing applications, image/video analysis applications, or other content generation, modification, and/or management applications. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus in other embodiments system 800 may comprise additional, fewer, or alternative subcomponents as compared to those included in the example embodiment of FIG. 8.

The aforementioned non-transitory computer readable medium may be any suitable medium for storing digital information, such as a hard drive, a server, a flash memory, and/or random access memory (RAM). In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CR-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical quantities within the registers, memory units, or other such information storage transmission or displays of the computer system. The embodiments are not limited in this context.

The terms "circuit" or "circuitry," as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hard-coded (e.g., nonvolatile) in memory devices. The circuitry may, collectively or individually, be embodied as circuitry that forms part of a larger system, for example, an integrated circuit (IC), an application-specific integrated circuit (ASIC), a system onchip (SoC), desktop computers, laptop computers, tablet computers, servers, smart phones, etc. Other embodiments may be implemented as software executed by a programmable control device. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood by an ordinarily-skilled artisan, however, that the embodiments may be practiced without these specific details. In other instances, well known operations, components and circuits have not been described in detail so as not to obscure the embodiments. It can be appreciated that the specific structural and functional details disclosed herein may be representative and do not necessarily limit the scope of the embodiments. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a method for adaptive selection of image feature keypoints. The method comprises receiving a set of feature keypoints associated with an image. The method further comprises generating contrast measurements of regions of the image associated with each of the feature keypoints. The method further comprises calculating a mean and a variance of the contrast measurements. The method further comprises generating ratios of principal curvatures of the regions of the image associated with each of the feature keypoints. The method further comprises calculating a mean and a variance of the ratios of principal curvatures. The method further comprises calculating a first threshold based on the mean and variance of the contrast measurements, and a second threshold based on the mean and variance of the ratios of principal curvatures. The method further comprises filtering the set of feature keypoints based on the first and second thresholds.

Example 2 includes the subject matter of Example 1, further comprising calculating the first threshold as the sum of the mean of the contrast measurements and a product of a first scale factor and the square root of the variance of the contrast measurements; and calculating the second threshold as the sum of the mean of the ratios of principal curvatures and a product of a second scale factor and the square root of the variance of the ratios of principal curvatures.

Example 3 includes the subject matter of Examples 1 and 2, further comprising selecting the first scale factor and the second scale factor to adjust the number of filtered feature keypoints.

Example 4 includes the subject matter of Examples 1-3, wherein the filtering removes feature keypoints associated with edge features in the image from the set of feature keypoints.

Example 5 includes the subject matter of Examples 1-4, wherein the feature keypoints are generated by a Scale Invariant Feature Transform (SIFT) performed on the image.

Example 6 includes the subject matter of Examples 1-5, wherein the image is provided by a camera that generates visual distortion to capture a wide angle field of view.

Example 7 includes the subject matter of Examples 1-6, further comprising mapping the filtered feature keypoints between multiple images.

Example 8 is a system to perform adaptive selection feature keypoints of an image. The system comprises a contrast statistics calculation circuit to generate contrast measurements of regions of the image associated with each of the feature keypoints, and to calculate a mean and a variance of the contrast measurements. The system further comprises an edge statistics calculation circuit to generate ratios of principal curvatures of regions of the image associated with each of the feature keypoints, and to calculate a mean and a variance of the ratios of principal curvatures. The system further comprises a threshold calculation circuit to calculate a first threshold based on the mean and variance of the contrast measurements, and a second threshold based on the mean and variance of the ratios of principal curvatures. The system further comprises a keypoint filter circuit to filter the set of feature keypoints based on the first and second thresholds.

Example 9 includes the subject matter of Example 8, wherein the threshold calculation circuit is further to calculate the first threshold as the sum of the mean of the contrast measurements and a product of a first scale factor and the square root of the variance of the contrast measurements; and calculate the second threshold as the sum of the mean of the ratios of principal curvatures and a product of a second scale factor and the square root of the variance of the ratios of principal curvatures.

Example 10 includes the subject matter of Examples 8 or 9, wherein the first scale factor and the second scale factor are selected to adjust the number of filtered feature keypoints.

Example 11 includes the subject matter of Examples 8-10, wherein the keypoint filter circuit is further to remove feature keypoints associated with edge features in the image from the set of feature keypoints.

Example 12 includes the subject matter of Examples 8-11, wherein the feature keypoints are generated from the image by a Scale Invariant Feature Transform (SIFT) circuit.

Example 13 includes the subject matter of Examples 8-12, wherein the image is provided by a camera that generates visual distortion to capture a wide angle field of view.

Example 14 includes the subject matter of Examples 8-13, further comprising a feature mapping module to map the filtered feature keypoints between multiple images provided by multiple cameras.

Example 15 is at least one non-transitory computer readable storage medium having instructions encoded thereon that, when executed by one or more processors, result in the following operations for adaptive selection of image feature keypoints. The operations comprise receiving a set of feature keypoints associated with an image. The operations further comprise generating contrast measurements of regions of the image associated with each of the feature keypoints. The operations further comprise calculating a mean and a variance of the contrast measurements. The operations further comprise generating ratios of principal curvatures of the regions of the image associated with each of the feature keypoints. The operations further comprise calculating a mean and a variance of the ratios of principal curvatures. The operations further comprise calculating a first threshold based on the mean and variance of the contrast measurements, and a second threshold based on the mean and variance of the ratios of principal curvatures. The operations further comprise filtering the set of feature keypoints based on the first and second thresholds.

Example 16 includes the subject matter of Example 15, further comprising calculating the first threshold as the sum of the mean of the contrast measurements and a product of a first scale factor and the square root of the variance of the contrast measurements; and calculating the second threshold as the sum of the mean of the ratios of principal curvatures and a product of a second scale factor and the square root of the variance of the ratios of principal curvatures.

Example 17 includes the subject matter of Examples 15 and 16, further comprising selecting the first scale factor and the second scale factor to adjust the number of filtered feature keypoints.

Example 18 includes the subject matter of Examples 15-17, wherein the filtering removes feature keypoints associated with edge features in the image from the set of feature keypoints.

Example 19 includes the subject matter of Examples 15-18, wherein the feature keypoints are generated by a Scale Invariant Feature Transform (SIFT) performed on the image.

Example 20 includes the subject matter of Examples 15-19, wherein the image is provided by a camera that generates visual distortion to capture a wide angle field of view.

Example 21 includes the subject matter of Examples 15-20, further comprising mapping the filtered feature keypoints between multiple images.

Example 22 is a system for adaptive selection of image feature keypoints. The system comprises means for receiving a set of feature keypoints associated with an image. The system further comprises means for generating contrast measurements of regions of the image associated with each of the feature keypoints. The system further comprises means for calculating a mean and a variance of the contrast measurements. The system further comprises means for generating ratios of principal curvatures of the regions of the image associated with each of the feature keypoints. The system further comprises means for calculating a mean and a variance of the ratios of principal curvatures. The system further comprises means for calculating a first threshold based on the mean and variance of the contrast measurements, and a second threshold based on the mean and variance of the ratios of principal curvatures. The system further comprises means for filtering the set of feature keypoints based on the first and second thresholds.

Example 23 includes the subject matter of Example 22, further comprising means for calculating the first threshold as the sum of the mean of the contrast measurements and a product of a first scale factor and the square root of the variance of the contrast measurements; and means for calculating the second threshold as the sum of the mean of the ratios of principal curvatures and a product of a second scale factor and the square root of the variance of the ratios of principal curvatures.

Example 24 includes the subject matter of Examples 22 and 23, further comprising means for selecting the first scale factor and the second scale factor to adjust the number of filtered feature keypoints.

Example 25 includes the subject matter of Examples 22-24, wherein the filtering removes feature keypoints associated with edge features in the image from the set of feature keypoints.

Example 26 includes the subject matter of Examples 22-25, wherein the feature keypoints are generated by a Scale Invariant Feature Transform (SIFT) performed on the image.

Example 27 includes the subject matter of Examples 22-26, wherein the image is provided by a camera that generates visual distortion to capture a wide angle field of view.

Example 28 includes the subject matter of Examples 22-27, further comprising means for mapping the filtered feature keypoints between multiple images.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications. It is intended that the scope of the present disclosure be limited not be this detailed description, but rather by the claims appended hereto. Future filed applications claiming priority to this application may claim the disclosed subject matter in a different manner, and may generally include any set of one or more elements as variously disclosed or otherwise demonstrated herein.

What is claimed is:

1. A processor-implemented method for adaptive selection of image feature keypoints, the method comprising:
   receiving, by a processor, a set of feature keypoints associated with an image, wherein the image is generated by a camera that causes visual distortion to capture a wide angle field of view;
   generating, by the processor, contrast measurements of regions of the image associated with each of the feature keypoints;
   calculating, by the processor, a mean and a variance of the contrast measurements;
   generating, by the processor, ratios of principal curvatures of the regions of the image associated with each of the feature keypoints;
   calculating, by the processor, a mean and a variance of the ratios of principal curvatures;
   calculating, by the processor, a first threshold based on the mean and variance of the contrast measurements, and a second threshold based on the mean and variance of the ratios of principal curvatures; and
   filtering, by the processor, the set of feature keypoints based on the first and second thresholds.

2. The method of claim 1, further comprising:
   calculating the first threshold as the sum of the mean of the contrast measurements and a product of a first scale factor and the square root of the variance of the contrast measurements; and
   calculating the second threshold as the sum of the mean of the ratios of principal curvatures and a product of a second scale factor and the square root of the variance of the ratios of principal curvatures.

3. The method of claim 2, further comprising selecting the first scale factor and the second scale factor to adjust the number of filtered feature keypoints.

4. The method of claim 1, wherein the filtering removes feature keypoints associated with edge features in the image from the set of feature keypoints.

5. The method of claim 1, wherein the feature keypoints are generated by a Scale Invariant Feature Transform (SIFT) performed on the image.

6. The method of claim 1, wherein the image is provided by a camera that generates visual distortion to capture a wide angle field of view.

7. The method of claim 1, further comprising mapping the filtered feature keypoints between multiple images.

8. A system to perform adaptive selection feature keypoints of an image, the system comprising:
   a contrast statistics calculation circuit to generate contrast measurements of regions of the image associated with each of the feature keypoints, and to calculate a mean and a variance of the contrast measurements;
   an edge statistics calculation circuit to generate ratios of principal curvatures of regions of the image associated with each of the feature keypoints, and to calculate a mean and a variance of the ratios of principal curvatures;
   a threshold calculation circuit to calculate a first threshold based on the mean and variance of the contrast measurements, and a second threshold based on the mean and variance of the ratios of principal curvatures; and
   a keypoint filter circuit to filter the set of feature keypoints based on the first and second thresholds.

9. The system of claim 8, wherein the threshold calculation circuit is further to:
   calculate the first threshold as the sum of the mean of the contrast measurements and a product of a first scale factor and the square root of the variance of the contrast measurements; and
   calculate the second threshold as the sum of the mean of the ratios of principal curvatures and a product of a second scale factor and the square root of the variance of the ratios of principal curvatures.

10. The system of claim 9, wherein the first scale factor and the second scale factor are selected to adjust the number of filtered feature keypoints.

11. The system of claim 8, wherein the keypoint filter circuit is further to remove feature keypoints associated with edge features in the image from the set of feature keypoints.

12. The system of claim 8, wherein the feature keypoints are generated from the image by a Scale Invariant Feature Transform (SIFT) circuit.

13. The system of claim 8, wherein the image is provided by a camera that generates visual distortion to capture a wide angle field of view.

14. The system of claim 8, further comprising a feature mapping module to map the filtered feature keypoints between multiple images provided by multiple cameras.

15. At least one non-transitory computer readable storage medium having instructions encoded thereon that, when executed by one or more processors, result in the following operations for adaptive selection of image feature keypoints, the operations comprising:
   receiving a set of feature keypoints associated with an image;
   generating contrast measurements of regions of the image associated with each of the feature keypoints;

calculating a mean and a variance of the contrast measurements;
generating ratios of principal curvatures of the regions of the image associated with each of the feature keypoints;
calculating a mean and a variance of the ratios of principal curvatures;
calculating a first threshold based on the mean and variance of the contrast measurements, and a second threshold based on the mean and variance of the ratios of principal curvatures; and
filtering the set of feature keypoints based on the first and second thresholds.

16. The computer readable storage medium of claim 15, further comprising:
calculating the first threshold as the sum of the mean of the contrast measurements and a product of a first scale factor and the square root of the variance of the contrast measurements; and
calculating the second threshold as the sum of the mean of the ratios of principal curvatures and a product of a second scale factor and the square root of the variance of the ratios of principal curvatures.

17. The computer readable storage medium of claim 16, further comprising selecting the first scale factor and the second scale factor to adjust the number of filtered feature keypoints.

18. The computer readable storage medium of claim 15, wherein the filtering removes feature keypoints associated with edge features in the image from the set of feature keypoints.

19. The computer readable storage medium of claim 15, wherein the feature keypoints are generated by a Scale Invariant Feature Transform (SIFT) performed on the image.

20. The computer readable storage medium of claim 15, wherein the image is provided by a camera that generates visual distortion to capture a wide angle field of view.

21. The computer readable storage medium of claim 15, further comprising mapping the filtered feature keypoints between multiple images.

* * * * *